(12) United States Patent
Nakamura

(10) Patent No.: US 9,696,461 B2
(45) Date of Patent: Jul. 4, 2017

(54) LENS ARRAY AND IMAGE DISPLAY DEVICE

(71) Applicant: YAZAKI CORPORATION, Tokyo (JP)

(72) Inventor: Go Nakamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 8 days.

(21) Appl. No.: 15/176,782

(22) Filed: Jun. 8, 2016

(65) Prior Publication Data
US 2016/0370509 A1  Dec. 22, 2016

(30) Foreign Application Priority Data

Jun. 19, 2015 (JP) .................................. 2015-123919

(51) Int. Cl.
| | | |
|---|---|---|
| *G02B 3/00* | (2006.01) | |
| *G02B 27/01* | (2006.01) | |
| *G03B 21/602* | (2014.01) | |
| *G03B 21/625* | (2014.01) | |

(52) U.S. Cl.
CPC .......... *G02B 3/0043* (2013.01); *G02B 3/0006* (2013.01); *G02B 3/0056* (2013.01); *G02B 27/0101* (2013.01); *G03B 21/602* (2013.01); *G02B 2027/013* (2013.01); *G02B 2027/0118* (2013.01); *G02B 2027/0194* (2013.01); *G03B 21/625* (2013.01)

(58) Field of Classification Search
USPC ....................................................... 359/455
See application file for complete search history.

(56) References Cited

U.S. PATENT DOCUMENTS

| | | | | |
|---|---|---|---|---|
| 2005/0180690 | A1* | 8/2005 | Sugiyama ........... | B29C 33/3842 385/33 |
| 2006/0050379 | A1* | 3/2006 | Yee ...................... | G03B 21/625 359/454 |
| 2010/0039819 | A1* | 2/2010 | Fournier ................ | F21V 14/06 362/268 |
| 2012/0280987 | A1* | 11/2012 | Iwane ................ | G02B 27/2214 345/419 |
| 2013/0182319 | A1* | 7/2013 | Chung ............... | G02B 27/2214 359/463 |

FOREIGN PATENT DOCUMENTS

| | | |
|---|---|---|
| JP | 63-221329 A | 9/1988 |
| JP | 7-270711 A | 10/1995 |
| JP | 2503485 B2 | 6/1996 |

* cited by examiner

*Primary Examiner* — Clayton E Laballe
*Assistant Examiner* — Linda B Smith
(74) *Attorney, Agent, or Firm* — Kenealy Vaidya LLP

(57) ABSTRACT

Provided is a lens array in which a plurality of convex lenses bidimensionally regularly-arranged along a predetermined reference face. The plurality of convex lenses is arranged so as to be inclined variedly mutually among the plurality of convex lenses around a vertex of a convex face of a reference posture as a rotation axis with respect to the reference posture mutually common to the plurality of convex lenses.

3 Claims, 3 Drawing Sheets

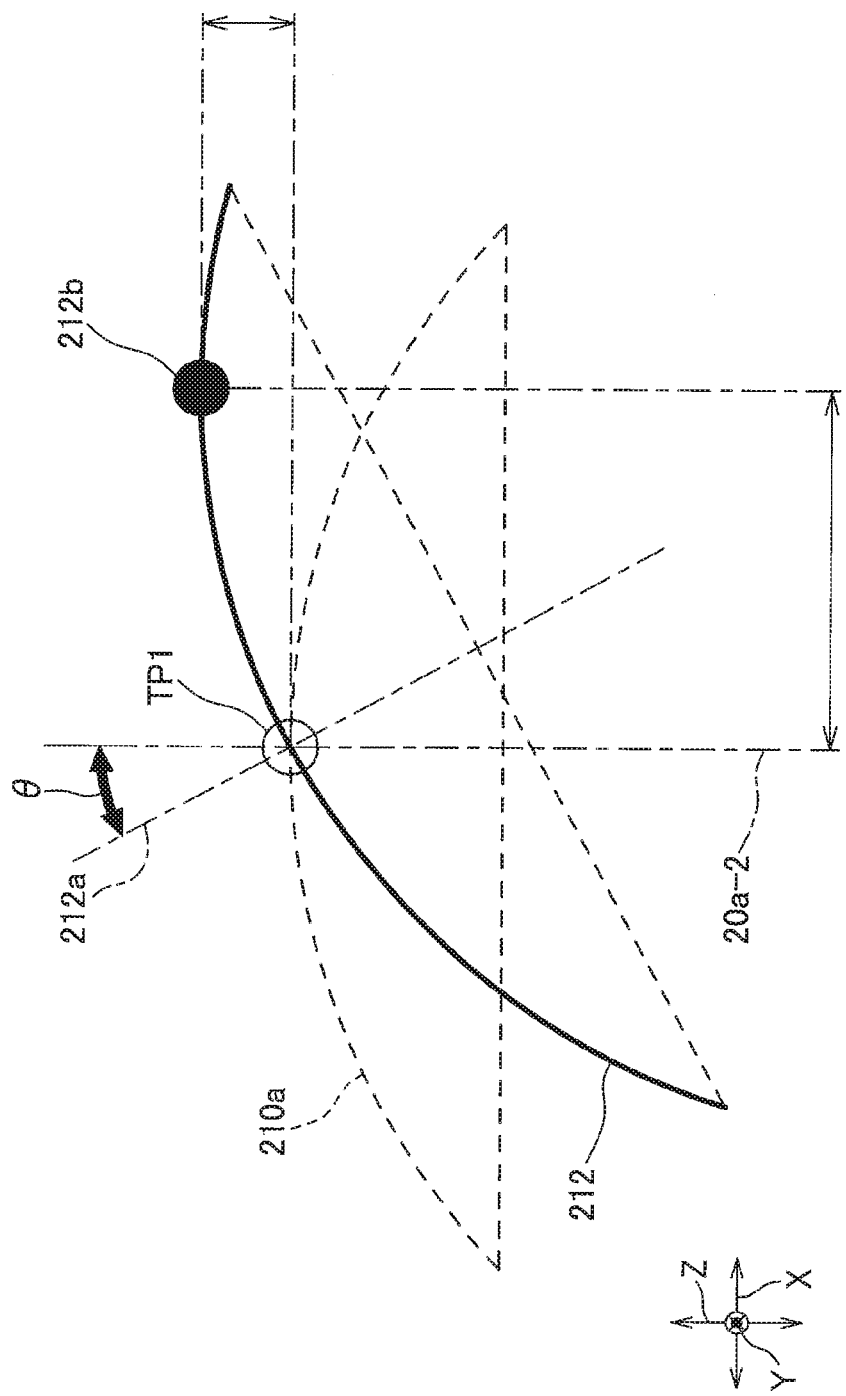

LENS ARRAY AND IMAGE DISPLAY DEVICE

CROSS REFERENCE

The present application claims priority to Japanese Patent Application No. 2015-123919 filed Jun. 19, 2015, which is hereby incorporated by reference in its entirety.

BACKGROUND OF THE INVENTION

Field of the Invention

The present invention relates to a lens array used for such a screen in an image display device, and an image display device including such lens array Description of the Related Art Conventionally, there is known ahead up display as an image display device showing a virtual image via a windshield to a passenger in a vehicle. And known as an example of such image display device is an image display device including alight source projecting light representing an image, and a transparent screen to which the light projected by the light source is irradiated, and utilizing a lens array as a screen s PTL 1 for example). This lens array is the one on which a plurality of convex lenses is bidimensionally-arranged along a predetermined reference face.

Here, known as what a structure similar to a lens array is included is a diffusion plate utilized for a reticle of a single lens reflex camera. The diffusion plate is the one in which a surface of such a glass plate is surface-roughened to provide micro concave-convex. In the case of utilizing such diffusion plate, size and arrangement of convex portions and concave portions on a surface thereon are so irregular that graininess like sand is shown on an image that the projecting light draws, possibly worsening an appearance of the image.

By contrast, in the case that a lens array where a plurality of convex lenses is bidimensionally regularly-arranged is utilized for the screen, such graininess as above on the image that the projecting light draws can hardly be seen due to regularity of lens arrangement. On the other hand, diffracted light due to cyclic structure of the lens array caused by the regularity of the lens arrangement occurs, likely inducing multiple lines blurring of iridescent on the image.

Accordingly, there has been proposed position in a plane view direction of vertex on each convex lens varied mutually among the plurality of convex lenses while the regularity of the lens arrangement remains unchanged (see PTL 2 for example) According to PTL 2, while assuring suppressing effect on graininess on the image due to the regularity of lens arrangement, varying position of vertex on each convex lens in the plane view direction as well, breaks cyclic structure of the lens array, suppressing multiple lines blurring of iridescent due to diffracted light.

Disadvantageously, according to the technology of the abovementioned PTL 2, varying the positions of vertex on each convex lens in order to suppress multiple lines blurring of iridescent by diffracted light also breaks the regularity of lens arrangement. For this reason, in order to further suppress the multiple lines blurring of the iridescent, broadening the variation of the vertex position of each convex lens may not in return be able to suppress the graininess.

CITATION LIST

Patent Literature

PTL 1: Japanese Patent Publication No. H7-270711
PTL 2: Japanese Patent No. 2503485

SUMMARY OF THE INVENTION

Therefore, an object of the present invention is to provide such lens array and all image display device including such lens array as to be consistent with both suppressions of graininess of an image and multiple lines blurring of iridescent.

The present invention according to a first aspect, in order to solve the above problem, is a lens array including a plurality of convex lenses bidimensionally regularly-arranged along a predetermined reference face, wherein the plurality of convex lenses is arranged so as to be inclined variedly mutually among the plurality of convex lenses around a vertex of a convex face of a reference posture as a rotation axis with respect to the reference posture mutually common to the plurality of convex lenses.

The invention according to a second aspect is characterized in that, in the lens array according to the first aspect, the plurality of convex lenses is bidimensionally arranged in a honeycomb fashion.

The invention according to a third aspect, in order to resolve the above problem, is an image display device including: a light source projecting a light indicating an image; and a transparent screen to which the light projected by the light source to be irradiated, wherein the screen includes a lens array in which a plurality of convex lenses bidimensionally regularly-arranged along a reference face intersecting with the light projected by the light source, and wherein the plurality of convex lenses is arranged so as to be inclined variedly mutually among the plurality of convex lenses around a vertex of a convex face of a reference posture as a rotation axis with respect to the reference posture mutually common to the plurality of convex lenses.

According to the invention of the first and third aspects, the above mutual inclinations with respect to the reference posture among the plurality of convex lenses are varied. The inclination of the convex lenses from the reference posture allows the vertex position of the convex face to shift toward the plane view direction from the vertex upon the reference posture and also toward a height direction from the reference face. Furthermore, such variation of the inclination mutually among the plurality of convex lenses allows to be varied mutually among the plurality of convex lenses. It follows from this that the vertex position of each convex lens of the lens array becomes varied not only in the plane view direction mutually among the plurality of convex lenses but in the height direction thereof. Not only can the variation in the plane view direction consequently be suppressed enough to suppress the graininess, but also the variation in the height direction can break the cyclic structure of the lens array, suppressing the multiple lines blurring of the iridescent by the diffracted light. As such the invention according to the first and third aspects, the graininess on the image and the multiple lines blurring of the iridescent by the diffracted light can be consistently suppressed. Furthermore, a parameter of varying the vertex position of each convex lens in the plane view direction and in the height direction is only such a single parameter as is inclination from the reference posture, allowing adequate variation to be set readily upon designing the lens array. Note that included among inclinations mentioned herein is a state where the convex lens has the reference posture at zero of an inclination degree.

Furthermore, according to the invention of the second aspect, arrangement in the honeycomb fashion allows the plurality of convex lenses to be minutely arranged, by which the lens array can be obtained with high lens density.

BRIEF DESCRIPTION OF THE DRAWINGS

FIG. 4 is a schematic view illustrating a way of a vertex position of a convex face shifting from the vertex at the reference posture due to a second convex lens being inclined from the reference posture.

DETAILED DESCRIPTION OF THE PREFERRED EMBODIMENTS

With reference to FIGS. 1 to 4, an image display device according to one embodiment of the present invention will be described.

Figure 1:
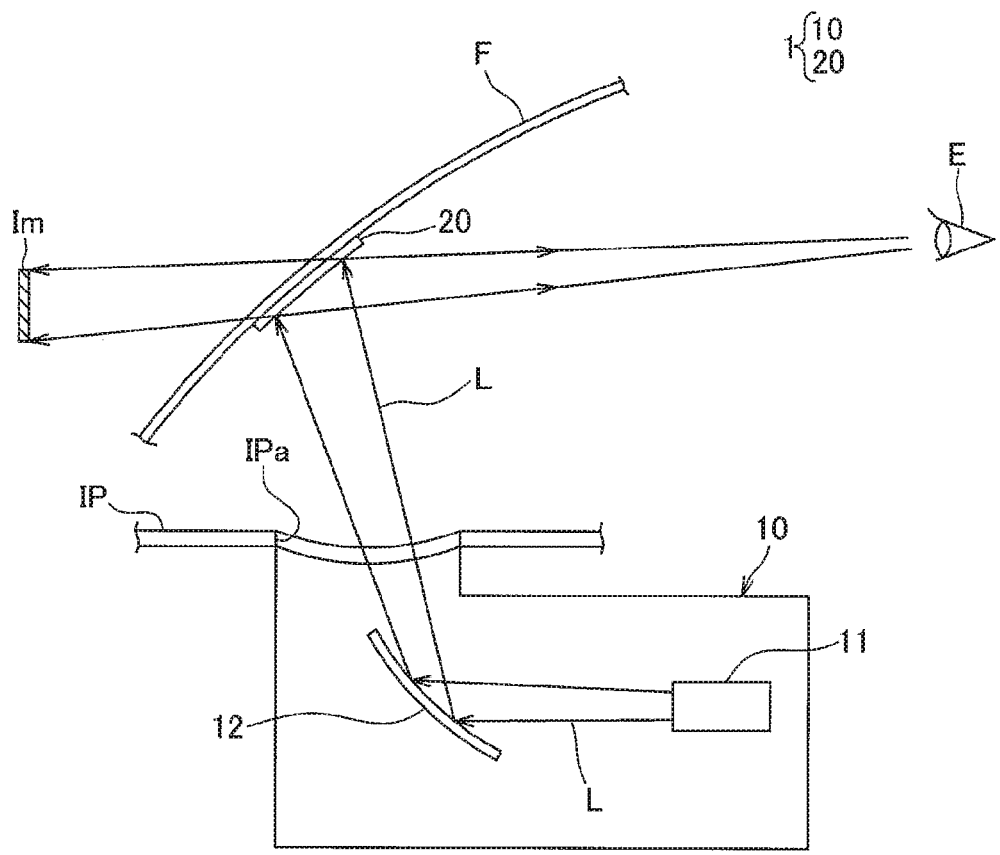
FIG. 1 is a schematic view illustrating an image display device according to one embodiment of the present invention.

FIG. 1 is a schematic view illustrating an image display device according to the one embodiment of the present invention. The image display device illustrated in FIG. 1 is a head up display device (referred to as HUD device hereinafter) allowing a passenger in a vehicle to sight a virtual image Im via a wind shield. The HUD device 1 includes a device body 10 disposed in an instrument panel IP, and a transparent screen 20 to be attached to a surface inside the vehicle. Note that a reference numeral E denotes an eye point that is a position of an eye of the passenger (an observer).

The device body 10 includes a light source 11 projecting a light L representing an image, and a reflection mirror 12 that guides the light L projected by the light source 11 toward a front glass F. In the present embodiment, for the light source 11, which is not limited herein, a various display devices such as TFT LCD (Thin Film Transistor Liquid Crystal Device), VFD (Vacuum Fluorescent Display) or the like can be used. The light L the light source 11 projects is reflected on the reflection mirror 12, passing through an opening IPa of the instrument IP, and is irradiated to the windshield F. To this irradiation position the transparent screen 20 adheres.

This screen 20 is made a half mirror plated remaining transparency on a surface of a lens array inside the vehicle to be mentioned later that is composed of a plurality of convex lenses in which convex face is oriented inside the vehicle. The light L irradiated on this screen from the body 10 is diffused on the surface of the screen 20 and reflected thereon, heading toward the eye point E of the passenger. The passenger, by sighting this light, sights the image displayed by the light L via the windshield as the virtual image Im.

Figure 2:
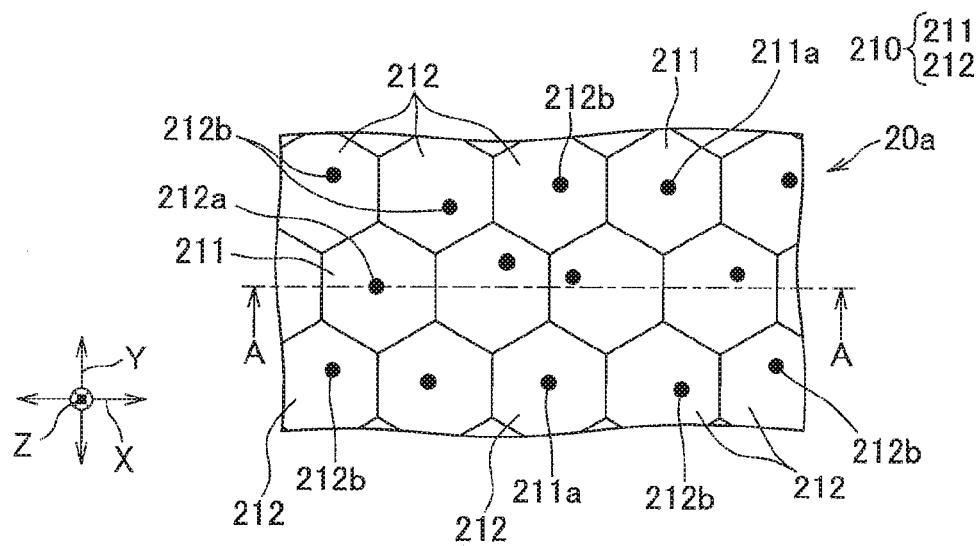
FIG. 2 is a partial plane view of a part of a lens array having a screen illustrated in FIG. 1.
Figure 3:
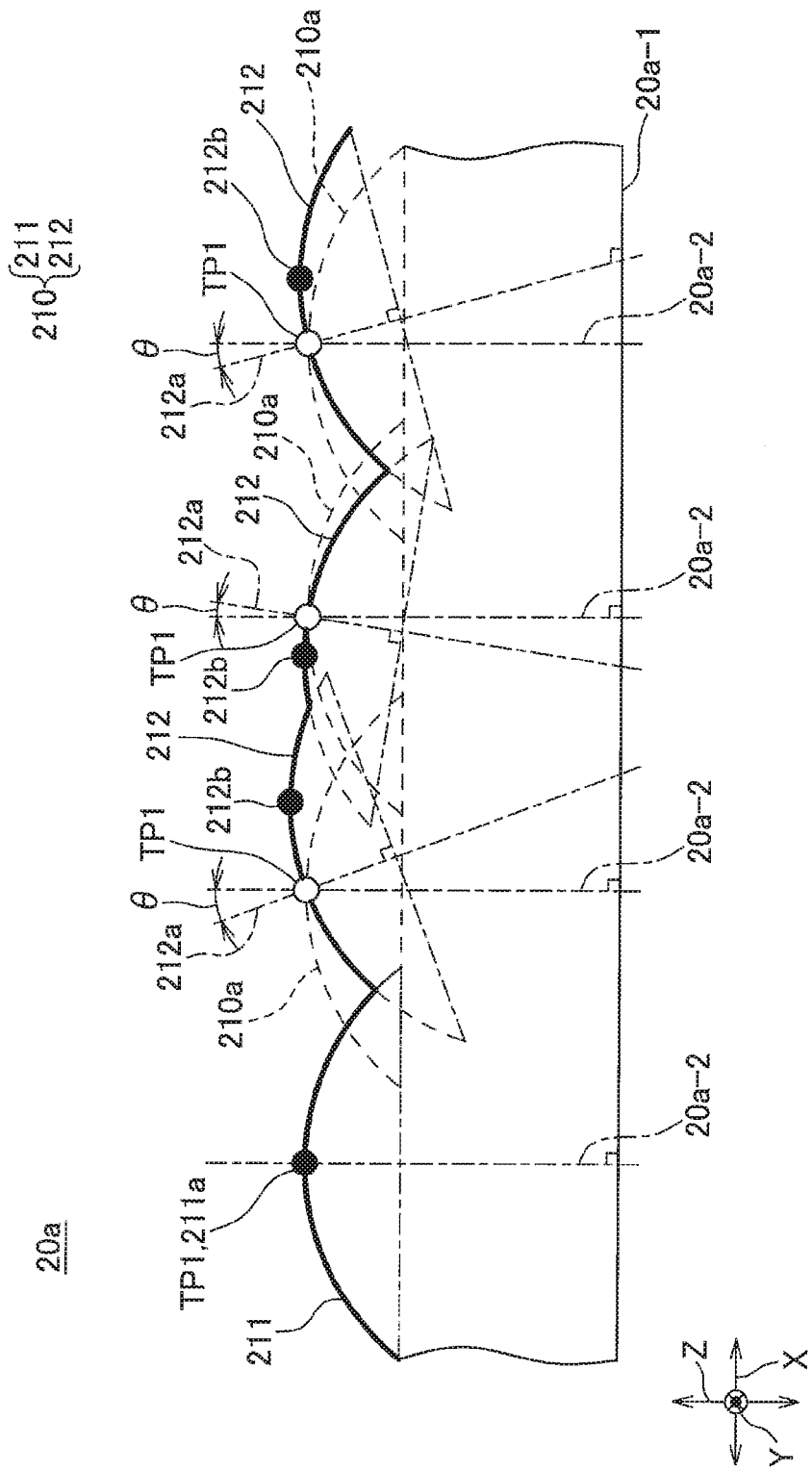
FIG. 3 is a cross-sectional view illustrating A-A cross-section in FIG. 2.

FIG. 2 is a partial plane view where a part of the lens array having the screen illustrated in FIG. 1 is taken from inside the vehicle, and FIG. 3 is a cross-sectional view illustrating A-A cross section in FIG. 2. The X direction in these figures donates a width direction of the vehicle, the Y direction a vertical direction along the windshield F, and the Z direction a perpendicular direction to the windshield F.

The lens array 20a is the one in which a plurality of convex lenses 210 is bidimensionally regularly-arranged along the reference face 20a-1. In the present embodiment, the reference face 20a-1 is a curved surface along a surface of the windshield F. Furthermore, the plurality of convex lenses 210 is, as shown in FIG. 2, arranged bidimensionally in a honeycomb fashion.

Herein, of the plurality of convex lenses 210, as a first convex lens 211 having common reference posture 210a and the other part is a second convex lenses 212 having inclined posture inclined from the reference posture 210a, mutually among the plurality of convex lenses 210. The reference posture 210a is, as shown in cross-sectional view of FIG. 3, a posture where a chard of an arc corresponding to the convex face is in generally parallel to the reference face 20a-1, and a height of vertex TPI of the convex face from the reference face 20a-1 becomes a predetermined height.

The posture the second convex lenses 212 has is the one inclined from the reference posture 210a around the vertex TP1 in the reference posture 210a. And the order of inclination from the reference posture 210a is irregularly different mutually among the second convex lenses 212 having inclined posture as shown in FIG. 3. It follows from this that in the lens array 210a the plurality of convex lenses 210 is arranged such that the inclination with respect to the reference posture 210a is varied mutually among the plurality of convex lenses 210.

In FIG. 3 the inclination is represented by an inclination degree $\theta$ that is formed by a normal line 20a-2 respective to the reference face 20a-1 and a line 212a (referred to as lens normal line) perpendicular to the chard of the arc respective to the convex face of each second convex lens 212. Note that FIG. 3 only illustrates the inclination component in the X-Z plane because a cross section is illustrated along the X-Z plane, but the inclination of the second convex lens 212 is three-dimensional, and the inclination degree $\theta$ also naturally includes an inclination in the Y-Z plane. Such inclination degree $\theta$ irregularly differs mutually among the second convex lenses 212.

Herein, in the first convex lenses 211 having the reference posture 210a, the vertex 211a thereof conforms to the vertex TP1 of the reference posture 210a. On the other hand, the second convex lenses 211 are inclined from the reference posture 210a, and thereby the position of the vertex 212b of the convex face shifts from the vertex TP1 of the reference posture 210a.

FIG. 4 is a schematic view illustrating a way of the vertex position of the convex face shifting from the vertex of the reference posture due to the second convex lens being inclined from the reference posture, The FIG. 4 illustrates one of the second convex lenses 212 illustrated in FIG. 3 being inclined in which a normal line 20a-2 respective to the reference face 20a-1 and a perpendicular line 212a forms an inclination degree $\theta$ . The inclination as such shifts the position of the vertex 212b of the convex face from the vertex TP1 of the reference posture 210a in a plane view (X direction in FIG. 4 for example), and also from the reference face 20a-1 in height direction (Z direction).

In the lens array 20a of the present invention, inclinations among two or more second convex lenses 212 vary, and thereby ways of shifting as such vary mutually among the second convex lenses 212. Furthermore, in the lens array 20a, such second convex lenses 212 is arranged dispersively along with the first convex lenses 211 in which the vertex 211a conforms to the vertex TP1 of the reference posture 210a follows from this that the positions of the vertexes 211a, and 212b of each of the convex lenses 211 and 212, as shown in FIG. 2, not only vary in the plane view direction (X-Y direction) but also, as shown in FIG. 3, in the height direction (Z direction) mutually among the plurality of convex lenses 211, 212.

In the HUD device illustrated in FIG. 1, lens arrangement regularity in the lens array 20a the screen has is to a certain extent broken, and thereby an appearance deteriorates due to occurrence of graininess as sanding on the virtual image Im. On the other hand, when the lenses are arranged excessively regularly, diffracted light due to cyclic structure caused by its regularity may occur, possibly inducing multiple lines blurring of iridescent on the virtual image Im.

In contrast, according to the present embodiment, variation of the vertex 211a, 212b of each convex lens 211, 212 in the plane view is suppressed enough to suppress the graininess, and also can suppress multiple lines blurring by the diffracted light by breaking the cyclic structure of the lens array 20a caused by variation in the height direction. As such, according to the present embodiment, it is possible to accommodate the suppressions of the graininess in the virtual image Im and the multiple lines blurring of the iridescent. Furthermore, since a parameter for varying the positions of vertex 211a, 212b of each convex lens 211, 212 in the plane direction and in the height direction spare one for the inclination state (inclination degree θ for example) from the reference posture 10a, it is possible to readily set adequate variation upon designing the lens array 20a.

Furthermore, in the present embodiment, since the plurality of convex lenses 211, 212 can minutely be arranged in honeycomb fashion, the lens array 20a can be achieved with high lens density.

Note that the aforementioned embodiment no more than illustrates the typical forms of the present invention, and the invention is not limited to the embodiment. Namely, a many types of variations can be implemented without departing from the spirit of the invention. Such variations, as far as including the lens array and the image display device of the invention, should lie within the invention.

Illustrated in the aforementioned embodiment for example is the HUD device 1 in which light is irradiated representing the image on the transparent screen 20 attached to the windshield F as the image display device of the present invention. However the image display device of the present invention is not limited thereto. The image display device of the present invention may be the one in which light representing the image is irradiated from backside of the transparent screen and an observer can sight an image drawn by light transmitting the screen.

Furthermore, illustrated in the aforementioned embodiment for example are the first convex lens 211 having the reference posture 210a and the second convex lens 212 inclined from the reference posture 210a being dispersively arranged. However, the lens array of the present invention is not limited thereto. The lens array of the present invention may consist of only the convex lens inclined from the reference posture for example.

REFERENCE SIGNS LIST

1 HUD device (one example of a display device)
11 light source
20 screen
20a lens array
20a-1 reference face
210 convex lens
210a reference posture
211 first convex lens
211a, 212b TP1, vertex
212 second convex lens
θ inclination degree

What is claimed is:

1. A lens array, comprising:
a plurality of convex lenses bidimensionally regularly-arranged along a predetermined reference face, wherein
the plurality of convex lenses includes lenses each of which is rotated around a vertex of a convex face of a reference posture, and lenses not rotated therearound, so that a rotational angle of each lens varies at the center of the vertex including 0°, the reference posture being defined as a posture in which the plurality of convex lenses is arranged such that height thereof from the reference face becomes same.

2. The lens array according to claim 1, wherein the plurality of convex lenses is bidimensionally arranged in a honeycomb fashion.

3. An image display device, comprising:
a light source projecting a light representing an image; and
a transparent screen on which the light projected by the light source is irradiated, wherein
the screen includes a lens array in which a plurality of convex lenses are bidimensionally regularly-arranged along a reference face intersecting with the light projected by the light source, and wherein
the plurality of convex lenses includes lenses each of which is rotated around a vertex of a convex face of a reference posture, and lenses not rotated therearound, so that a rotational angle of each lens varies at the center of the vertex including 0°, the reference posture being defined as a posture in which the plurality of convex lenses is arranged such that height thereof from the reference face becomes same.

* * * * *